United States Patent [19]

Neuman et al.

[11] Patent Number: 4,486,304
[45] Date of Patent: Dec. 4, 1984

[54] APPARATUS FOR CONTINUOUSLY FILTERING PLASTIC MELT WITH NONINTERRUPTIVE PURGE

[76] Inventors: Clayton L. Neuman, 11440 Olive St., Coon Rapids, Minn. 55433; Donald J. Reum, 330 Sixth St., Albany, Minn. 56307

[21] Appl. No.: 389,378

[22] Filed: Jun. 17, 1982

[51] Int. Cl.³ ...................... B01D 29/38; B01D 35/12
[52] U.S. Cl. .................................. 210/107; 210/108; 210/333.1; 210/142; 210/414; 425/197; 74/99 A; 74/128
[58] Field of Search ............... 210/413, 414, 106, 107, 210/108, 333.1, 445, 422, 433.1, 142; 425/197, 198, 199, 227, 228, 185, 186; 264/39, 169; 74/99 A, 128, 142

[56] References Cited

U.S. PATENT DOCUMENTS

| | | | |
|---|---|---|---|
| 1,887,129 | 11/1932 | Hirsch | 210/333.1 |
| 2,024,358 | 12/1935 | Henry | 210/333.1 |
| 2,077,589 | 4/1937 | Seaver et al. | 210/333.1 |
| 2,237,964 | 4/1941 | Haught | 210/333.1 |
| 2,980,256 | 4/1961 | Nash | 210/333.1 |
| 3,176,846 | 4/1965 | Adams | 210/333.1 |
| 3,228,528 | 1/1966 | Mummert et al. | 210/333.1 |
| 3,380,591 | 4/1968 | Muller | 210/333.1 |
| 3,445,002 | 5/1969 | Muller | 210/333.1 |
| 3,493,113 | 2/1970 | Rosaen | 210/333.1 |
| 3,557,959 | 1/1971 | Muller | 210/333.1 |
| 3,703,465 | 11/1972 | Reece et al. | 210/333.1 |
| 3,717,252 | 2/1973 | Picard | 210/333.1 |
| 3,856,277 | 12/1974 | Tiramani | 425/197 |
| 4,059,518 | 11/1977 | Rishel | 210/107 |
| 4,119,540 | 10/1978 | Muller | 210/142 |

FOREIGN PATENT DOCUMENTS

| | | | |
|---|---|---|---|
| 2737135 | 3/1979 | Fed. Rep. of Germany | 210/333.1 |
| 47-7312 | 3/1972 | Japan | 210/413 |
| 25362 | 3/1931 | Netherlands | 210/413 |

OTHER PUBLICATIONS

"There are Profits to be Mined from Film Scrap, and Better Ways to Do It", *Modern Plastics*, Sep. 1981, pp. 91-93.

Primary Examiner—Richard V. Fisher
Assistant Examiner—John W. Czaja
Attorney, Agent, or Firm—Merchant, Gould, Smith, Edell, Welter & Schmidt

[57] ABSTRACT

Apparatus is disclosed for continuously filtering a flow of melted plastic which includes a mechanism for purging the filter without interrupting continuous operation. A filter screen is disposed in a circular chamber within the filter housing. A collector plate including a plurality of radially oriented, triangularly shaped passages is disposed on the upstream side of the filter screen, defining triangular pockets for collecting contaminants that cannot pass through the filter screen. A collector head is rotatably disposed for selective registration with the collector pockets, and an indexing mechanism is included for sequentially stepping the collector head around the collector plate for momentary registration with each collector pocket. The collector head communicates with a contaminant discharge passage that is opened and closed in timed sequence with movement of the collector head. With the collector head in position over a triangular pocket and the contaminant discharge passage open, a part of the filtered plastic downstream of the filter screen reverses its flow through the screen and collector head, purging the screen by carrying collected contaminants with it. The discharge passage is opened for a short period of time so that the reverse flow for each pocket is a small discrete volume. Because of this, the combined discrete quantities of filtered plastic used in the screen purging process as the collector head cycles through communication with each pocket is held to a minimum, while at the same time insuring continuous filtering operation.

19 Claims, 17 Drawing Figures

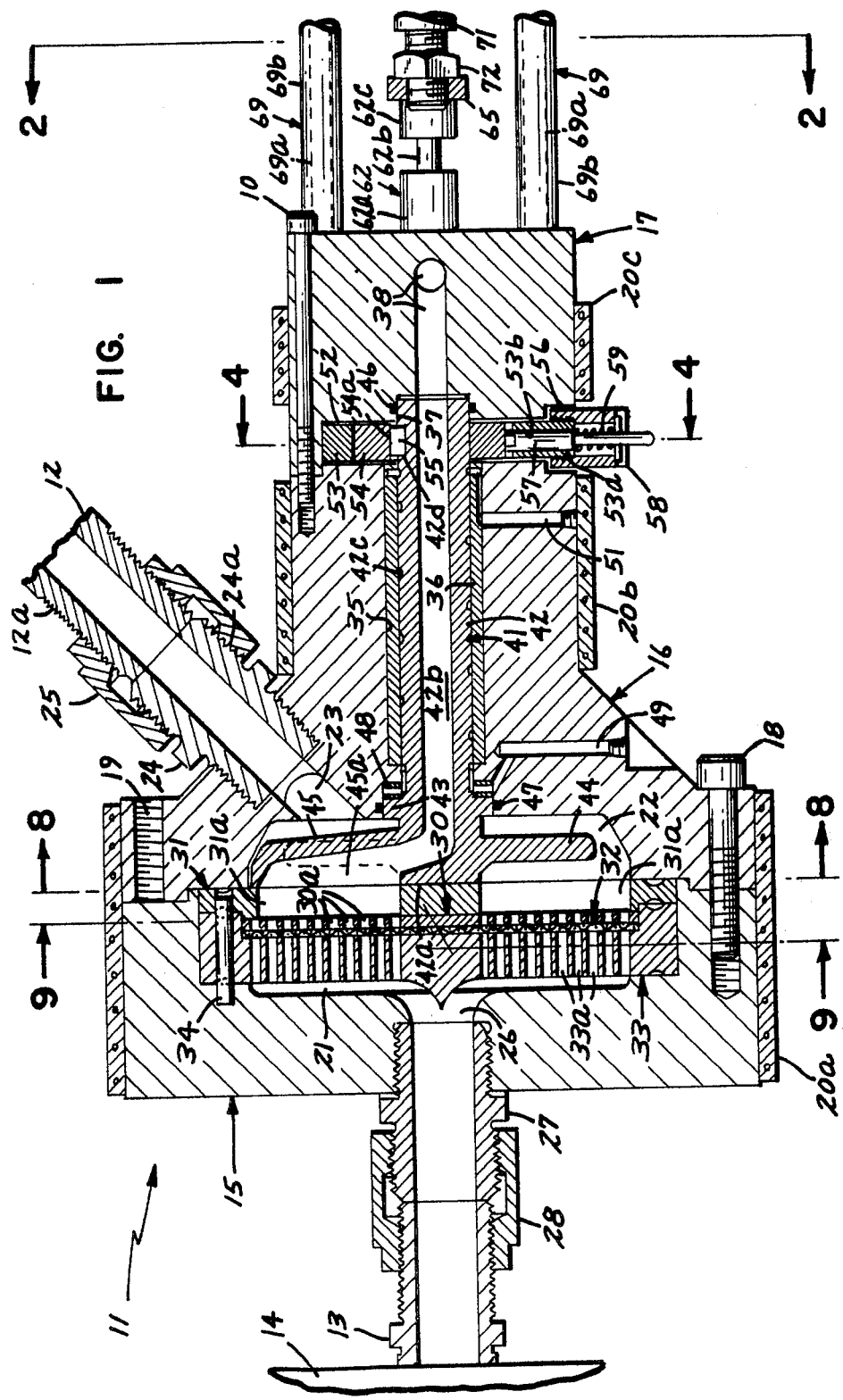

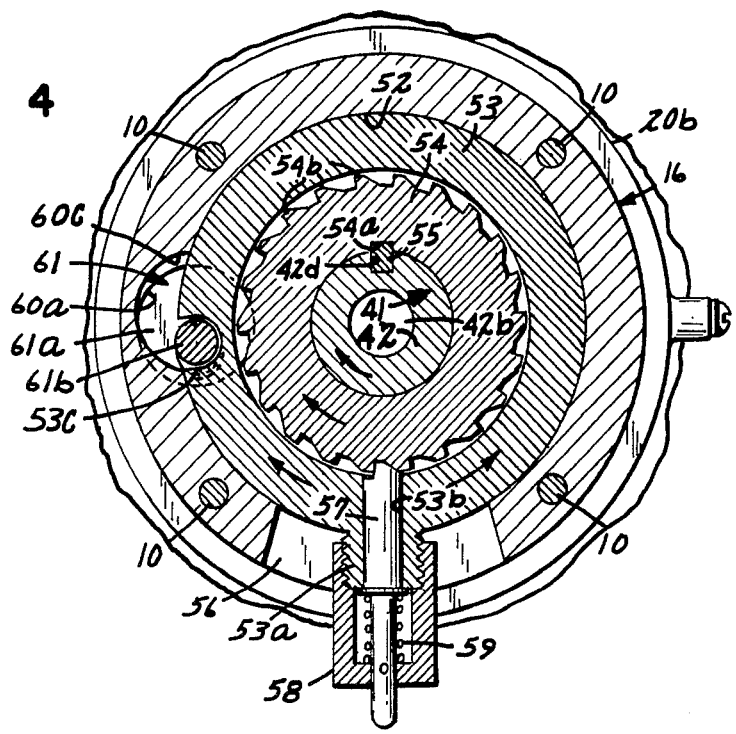
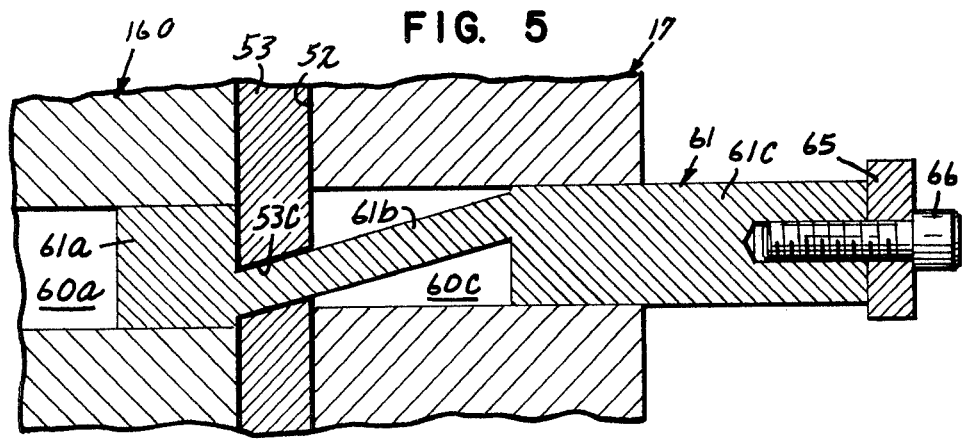
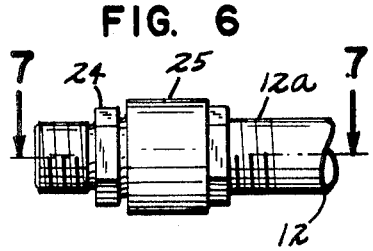
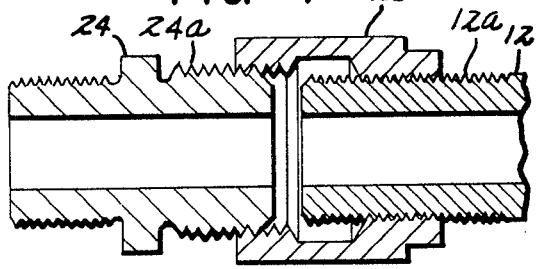

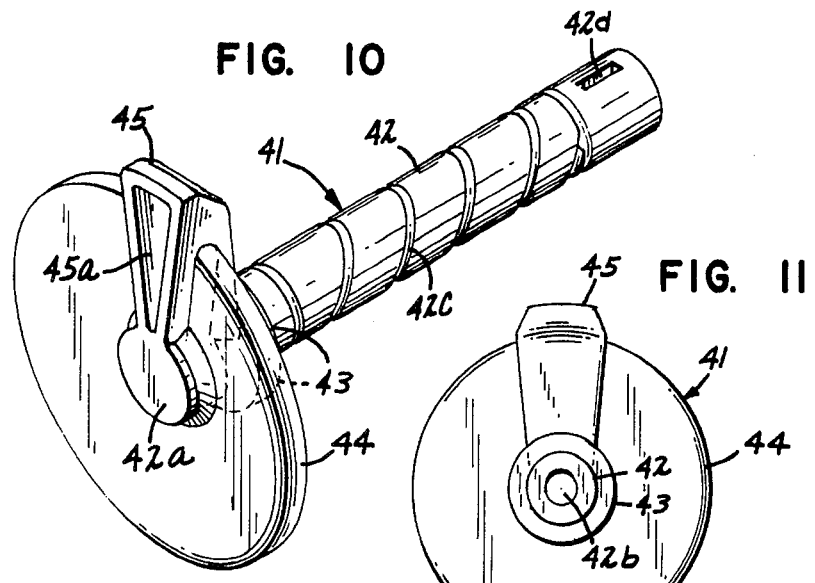
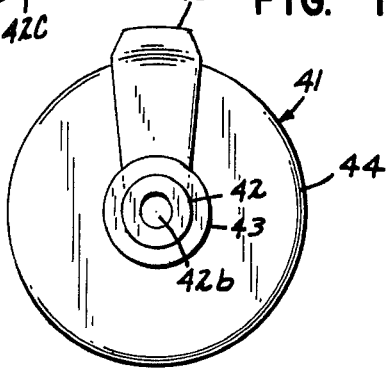
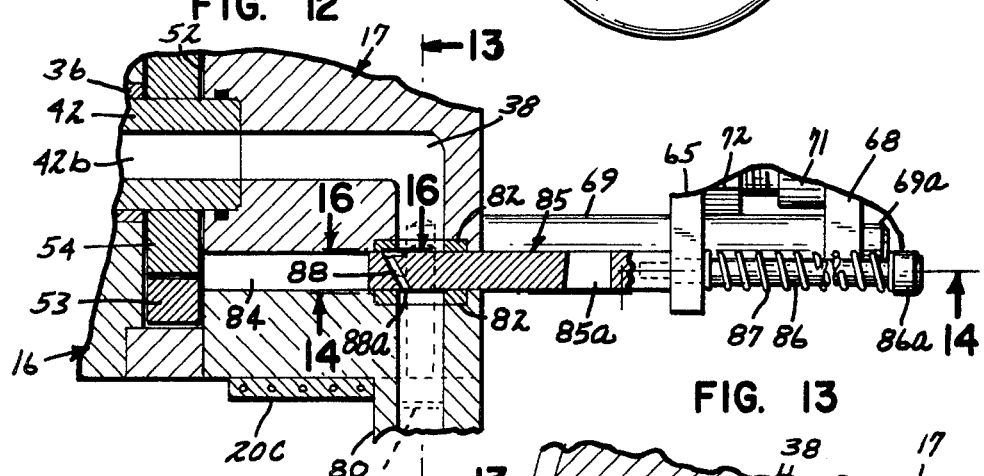

APPARATUS FOR CONTINUOUSLY FILTERING PLASTIC MELT WITH NONINTERRUPTIVE PURGE

TECHNICAL FIELD

The invention relates generally to filtering apparatus and is specifically directed to apparatus for continuously filtering a flow of melted plastic which includes a mechanism for purging the filter without interrupting continuous operation.

BACKGROUND OF THE INVENTION

It is common to filter a flow of melted plastic in the high pressure line leading to an extrusion die or injection molding cavity to insure high quality of the resulting plastic products.

Melted plastic represents a unique problem insofar that standard fluid filtering techniques are concerned by virtue of its substantial viscosity, the high temperatures at which plastic must be maintained, the narrow range of temperatures in the elevated temperature range in which plastic must be maintained to insure satisfactory flow without high temperature degradation, the extremely high pressures under which plastic is subjected to cause the flow, and the need for a homogeneous flow that not only is devoid of contaminants but of air and other gases as well.

Some of these problems are insubstantial where prime virgin plastic is used in the production run, but they are compounded for plastic of lesser quality such as recycled plastic.

Recycled plastic represents a valuable resource if it can be filtered or cleaned sufficiently before extrusion. Its quality can be greatly enhanced if it is carefully filtered to remove all of the contaminants associated with recycled materials, which include degradations of the plastic itself and all types and sizes of nonplastic particulate matter. Recycled plastic, however, creates a particularly significant problem because of the size and volume of contaminants to be removed, and the need for frequent purging of the filtering means.

Many plastic filtration devices filter efficiently, but purging requires disassembly of the unit and significant downtime while the filter screen is cleaned or replaced. In the case of recycled plastic, where the contaminants are considerable, filtering apparatus without some type of intermittently operating purge mechanism cannot effectively be used.

Other types of plastic filters include purge mechanisms, but they are usually either of insufficient capability to handle the contaminants filtered from recycled plastic, or the purge itself involves a significant waste of material during the purging process. For example, it is known to use a portion of the filtered material as a reverse flow through the filter to dislodge contaminants, but the flow of filtered plastic required for the purge is either substantial, or, if a lesser volume, insufficient to accomplish the purge.

In all cases involving the purge of filtering apparatus from melted plastic, it is essential to either avoid the entry of air or other gases into the flow or to run the plastic a period of time after the purge is completed to avoid the presence of air bubbles in the product, which makes it unacceptable.

SUMMARY OF THE INVENTION

Our invention resides in filtering apparatus intended primarily for filtering a flow of melted plastic in which filtering occurs continuously, but also in which a purge cycle can be initiated periodically or continuously, depending on the requirements of the type of plastic used. In either case, the purge uses filtered plastic in small discrete quantities to avoid undue waste. The fitering apparatus is entirely closed and may be operated without the entry of air in the system.

These several highly advantageous functions are accomplished with a preferred embodiment which employs a conventional filter screen disposed between the inlet and outlet of a substantial steel housing capable of withstanding significant inline pressures. The filter screen is sandwiched between breaker plates having a substantial plurality of openings larger than the filtration openings of the screen. A collector plate is also disposed on the upstream side adjacent one of the breaker plates. The collector plate includes a plurality of triangularly shaped passages that are equiangularly spaced around the plate and extend radially outward from its center. Each one of the triangular passages creates a triangular pocket for collecting contaminants that cannot pass through the filter screen.

Immediately upstream and in engagement with the collector plate is a collector head configured to sealably encircle one of the triangular pockets. The collector head is rotatable for selective registration with any of the collector pockets, and in the preferred embodiment it is sequentially stepped around the collector plate for momentary registration with each collector pocket.

The collector head has a generally triangular mouth that overlies the triangular collector pocket, and which is in continuous communication with a contaminant discharge passage. Valve means are disposed to either block or open the discharge passage. With the discharge passage closed, it is subjected to static pressure and unable to receive any flow of plastic. With the valve open, a substantial pressure differential exists between the outlet chamber of the filter apparatus and ambient pressure, resulting in a reverse flow of filtered plastic through the filter screen, collector head and contaminant discharge passage. It is this reverse flow which releases the contaminants from the screen and carries them out for discharge.

The valve means for the contaminant discharge passage is timed in cooperation with means for rotatably indexing the collector head with each of the collector pockets. The valve means opens the discharge passage for a period of brief duration (on the order of two seconds), which permits the associated collector pocket and segment of the filter screen to be purged. The valve means then closes the discharge passage as stepped indexing of the collector head begins, and upon registration of the collector head with the next adjacent triangular pocket, the valve means is again actuated to effect reverse purge flow through this newly aligned pocket.

The sequence continues until each pocket has been freed of all contaminants. The cycle may then begin again, or a period of time may lapse before beginning the purge again.

As constructed, the inventive filtering apparatus overcomes each of the problems encountered with filtration of melted plastic containing substantial contaminants. The apparatus is capable of moving all contaminants of all shapes and sizes on a continuous basis, and the contaminant purge does not interrupt the filtering operation or have any adverse effect on the resulting high quality of the filtered plastic.

BRIEF DESCRIPTION OF THE DRAWINGS

FIG. 1 is a sectional view of plastic filtering apparatus embodying the invention with respect to a vertical plane passing longitudinally through the apparatus;

FIG. 4 is an end sectional view of the apparatus taken along the line 4—4 of FIG. 1, showing in particular a ratchet mechanism for rotationally stepping the purge mechanism;

FIG. 5 is an enlarged fragmentary sectional view of a piston for rotationally advancing the ratchet mechanism of FIG. 4, as taken along the line 5—5 of FIG. 3;

FIG. 6 is a view in side elevation of a threaded mechanical coupler used in the inventive apparatus;

FIG. 7 is an enlarged sectional view of the coupler taken along the line 7—7 of FIG. 6;

FIG. 10 is a perspective view of a reverse flow contaminant collector used in the inventive filtering apparatus;

FIG. 11 is an end view of the contaminant collector as viewed from the end opposite that shown in FIG. 10;

FIG. 12 is a view similar to FIG. 3 of an alternative valving arrangement for the discharge of contaminant;

FIG. 13 is a fragmentary sectional view of the alternative valving arrangement taken along the line 13—13 of FIG. 12;

FIG. 14 is a fragmentary sectional view of the alternative valving arrangement taken along the line 14—14 of FIG. 12;

DETAILED DESCRIPTION

Figure 1A:
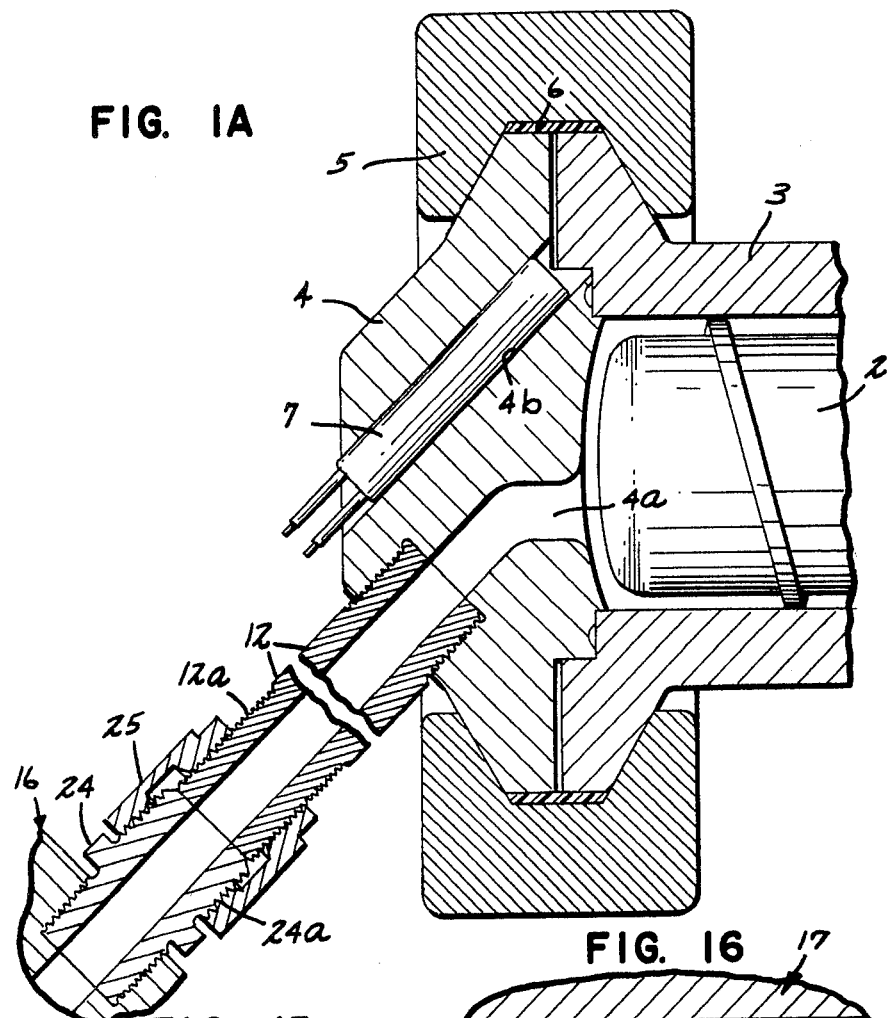
FIG. 1A is a sectional view of the discharge end of an extruder screw, showing in particular an end adapter plate for the screw and the coupling mechanism leading to the plastic filtering apparatus of FIG. 1.

With initial reference to FIG. 1, filtering apparatus embodying the invention is represented generally by the numeral 11. Apparatus 11 receives unfiltered plastic under significant pressure through an inlet pipe 12 from an extruder screw shown in FIG. 1A and described below. The filtered plastic is discharged from the apparatus 11 through an outlet pipe 13 that is connected to an extruder die 14 only a fragment of which is shown.

The body of apparatus 11 comprises an assembly of block components configured to mate with each other and to receive various operative components of the apparatus. An end block 15 (on the left end as viewed in FIG. 1) is of cylindrical configuration, and mates with a middle block 16. Middle block 16 conforms to the diameter of end block 15 but steps down to a smaller diameter to receive an end block 17.

Figure 2:
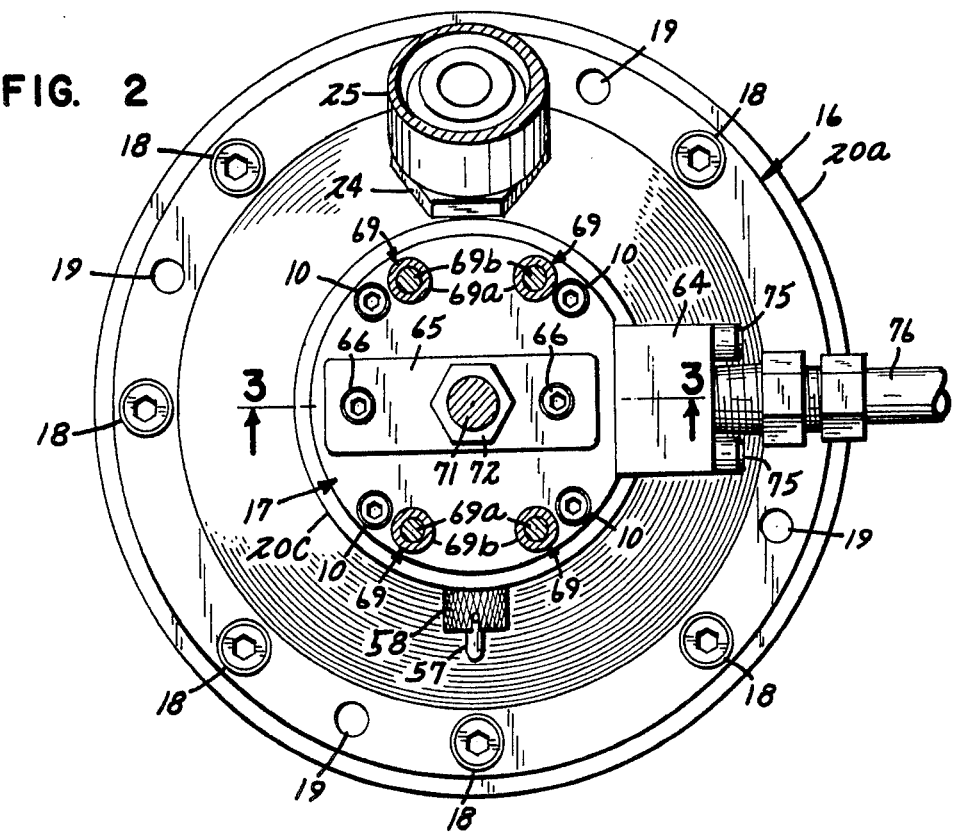
FIG. 2 is an end sectional view of the apparatus taken along the line 2—2 of FIG. 1 showing in particular the external assembly of components of the inventive apparatus.

With additional reference to FIG. 2, middle block 16 is sealably secured to end block 15 with a plurality of mounting bolts 18 that are equiangularly spaced around its periphery. In addition, jackscrew holes 19 are provided at spaced intervals between the mounting bolts 18 to permit the blocks 15, 16 to be jacked apart for access to the filtration components described below. Circular chambers 21, 22 are respectively formed in blocks 15, 16 in axial facing position, the chamber 22 serving as an inlet chamber and the chamber 21 serving as an outlet chamber. An inlet passage 23 leads from chamber 22 to a threaded inlet nipple 24 secured to the inlet pipe 12 with a coupler 25.

End block 17 is secured to middle block 16 by a plurality of bolts 10 (FIGS. 1 and 2).

Heater bands 20a, 20b and 20c encircle the block assembly to maintain the apparatus 11 at a constant temperature that is sufficiently high to insure proper flow of the plastic melt but low enough to avoid degradation of the plastic.

An outlet passage 26 leads axially from outlet chamber 21 through a threaded outlet nipple 27 to the outlet pipe 13. The nipple 27 and outlet pipe 13 are joined by a coupler 28.

Couplers 25, 28 are similar in construction, and reference is made to FIGS. 6 and 7 for an exemplary description of structure and operation of the coupler 25. As will be noted in FIG. 7, inlet pipe 13 has an outer diameter that is smaller than the adjacent portion of inlet nipple 24, and is formed with a substantial length of smaller threads 13a. The larger diameter abutting portion of the outlet nipple 24 is provided with a shorter length of larger threads 24a.

Coupler 25 has two inside diameters, the smaller conforming to the outside diameter of the inlet pipe 13 and being formed with identical threads. The opposite end conforms in size and threads to the inlet nipple 24. A threadless zone is disposed between the threaded areas.

In operation, the coupler 25 is screwed onto the smaller inlet pipe 13 so that it is positioned well onto the threads 13a. This assembly is brought into abutting relation with the free end of inlet nipple 24, which is screwed into the middle block 16. The coupler 25 is then screwed onto the threads 24a as shown in FIG. 7. While this serves to unscrew the coupler 25 from the threads 13a, the larger size of the threads 24a as compared with the threads 13a causes the pipe 13 and nipple 24 to be brought together into tight sealing relation. The threadless zone in the coupler 25 makes it easier to start the coupling process and to arrive at a tightness without having one thread interface with the other.

Coupler 28 operates in the same manner with respect to outlet nipple 27 and outlet pipe 13.

The couplers 25, 28 enable the apparatus 11 to be installed and removed with simplicity.

With reference to FIG. 1A, an extruder screw 2 is disposed in a cylindrical housing 3 having a flared open end which mates with a similarly shaped end adapter plate 4. The housing 3 and adapter plate 4 are held in sealed relation by a compression ring 5 acting through an annular seal 6.

The adapter plate 4 has formed therein an outlet opening communicating with the screw chamber which is offset from the rotational axis of the extruder screw 2. The outlet 4a extends axially outward a short distance and then elbows downward at 45° to a threaded recess for receiving the end of inlet pipe 12.

The outlet 4a is positioned in this offset manner to avoid the natural vortex and trap effect that exists at the end of extruder screw 2 at its center. All melted plastic that is being augered forward by the screw 2 must move laterally away from its center in order to enter the offset outlet 4a. This gives rise to a "washing" of the tip of the extruder screw 2 and reduces the possibility of degradation to the plastic which might otherwise become stagnant at the center of the vortex.

A second passage 4b is formed in the adapter plate 4 at 45° from the center line of the extruder screw 2 in spaced, parallel relation to the angular portion of outlet 4a. This passage 4b extends entirely through the adapter plate 4, and is configured to receive a cylindrical heating cartridge 7 that is adapted for connection to a source of electrical power through the leads shown. Preferably, the cartridge 7 is thermostatically controlled to maintain the plastic melt within a desired temperature range as described above.

Figure 9:
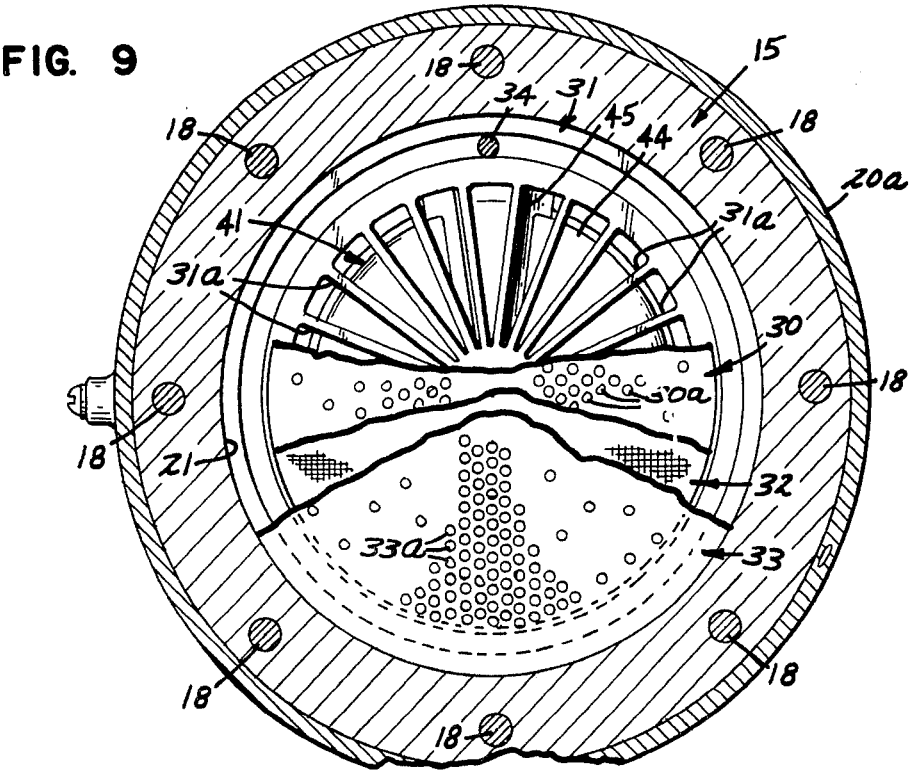
FIG. 9 is an axial sectional view of the apparatus as taken along the line 9—9 of FIG. 1.

An assembly of filtration components is disposed in the outlet chamber 21 as shown in FIGS. 1 and 9. The assembly is cylindrical in shape to correspond to the configuration of the chamber 21, and comprises a collector plate 31, a first breaker plate 30, a filter screen 32 and a second breaker plate 33. Collector plate 31 and second breaker plate 33 are of the same diameter, and a shallow circular recess is formed in the latter so that the first breaker plate 30 and filter screen 32, which are of lesser diameter, are clamped therebetween. A registration pin 34 passes through the plates 31, 33 and a registration bore in the end block 15 to prevent rotation of the component assembly.

As best shown in FIG. 9, the collector plate 31 is formed with a plurality of triangularly shaped passages 31a that are equiangularly spaced and extend radially outward. As best shown in FIG. 1, the radial length of the passages 31a does not extend beyond the outermost dimension of the filter screen 32, so that each passage 31a communicates entirely with the filter screen 32.

The filter screen 32 itself is of wire mesh and may be of various filtration sizes. Wire mesh filtration screens of this type are well known and commercially available.

The breaker plates 30, 33 are formed with a plurality of axially extending bores 30a, 33a, respectively, that are arranged in staggered circular rows. The bores 30a, 33a are sized to carry the filtered flow toward and away from the filter screen 32, and in the preferred embodiment have a diameter of ⅛ inch (FIG. 9). Thus, the breaker plates 30, 33 offer strong backing support to both sides of the more fragile filter screen 32 without obstructing the flow.

As constructed, the assembly comprising plates 30, 31, 33 and screen 32 receive unfiltered plastic from the inlet chamber 12. The plastic flows through the triangular passages 31a without obstruction, and then moves through the breaker plate 30 and filter screen 32 before discharge through the breaker plate 33. Contaminants in the unfiltered plastic are retained by the wire mesh filter screen 32 and are collected in the respective triangular passages 31a. Because the flow of plastic through the filtration assembly is under significant pressure, the passages 31a serve as collector pockets for the contaminants.

With reference to FIGS. 1 and 8-11, an axially extending bore 35 is formed entirely through the middle block 16, opening into the inlet chamber 22. The bore 35 is stepped to receive an elongated sleeve bearing 36. A bore 37 having a diameter corresponding to the inside diameter of bearing 36 extends for a short distance into end block 17 and then steps down to a contaminant discharge passage 38.

Immediately adjacent the inlet chamber 22, axial bore 35 is stepped to a larger diameter for a purpose described below.

With reference to FIGS. 1, 8, 10 and 11, a reverse flow contaminant collector is represented generally by the numeral 41. As described in further detail below, the contaminant collector 41 is configured to occupy and rotate in the inlet chamber 22 and axial bores 35, 37.

As best shown in the perspective view of FIG. 10, contaminant collector 41 comprises a thick longitudinal tube 42 that is rotatably disposed in the bores 35, 37. The tube 42 projects rearwardly from the slightly enlarged collar 43 and a large diameter, thin circular plate 44. Integrally formed with the circular plate 44 is a collector head 45 that is somewhat triangularly shaped and occupies a generally triangular segment of the plate 44. The collector head 45 extends radially outward from the closed end 42a of tube 42.

With reference to FIGS. 1 and 10, collector head 45 defines a triangularly shaped inlet 45a that conforms in size and shape to and is selectively registrable with each of the triangular passages or pockets 31a in collector plate 31. As best shown in FIG. 1, the inlet 45a communicates with an axial bore 42b that is aligned with the discharge passage 38.

It is intended that the contaminant collector 41 rotate in stepped fashion for registration with each of the triangular passages 31a. This is facilitated by the sleeve bearing 36 and the inclusion of annular teflon seals 46, 47 disposed at each end of the tube 42. This rotation is also facilitated through the use of a roller thrust bearing 48 that is disposed in the enlarged step of bore 35 for axial engagement by the collar 43.

A grease inlet passage 49 is formed in middle block 16, leading to the roller thrust bearing 48. The thrust bearing 48 in turn communicates with a spiral groove 42c formed in the outer surface of tube 42, insuring that high temperature grease will be continuously supplied to moving surfaces. The spiral groove 42c communicates with a grease outlet passage 51 which is also formed in the middle block 16.

With continued reference to FIG. 1, it will be observed that the back face of collector head 45 is spaced from the opposed front face of inlet chamber 22. Even so, when the collector head 45 is in the position shown in FIG. 1, it partially obstructs the inlet passage 23 leading from inlet pipe 12. For this reason, and as represented by the phantom line in FIG. 8, the inlet passage 23 is flared laterally to enable incoming plastic to flow around the collector head 45.

Also as shown in FIG. 1, the diameter of the circular plate 44 is somewhat less than the overall diameter of the chamber 22. The clearance between the plate 44 and wall of chamber 22 defines an annular passageway for the incoming plastic flow. The purpose of the plate 44 is to spread the incoming plastic, causing it to flow uniformly through the filter screen 32 and insuring that all plastic travels the same distance notwithstanding the route it takes. The result is optimum filtration of the plastic.

As will be described in further detail below, the discharge passage 38 is normally closed during the continuous filtering operation of apparatus 11. As such, during normal operations, the entire flow of plastic is from the inlet pipe 12 and inlet passage 23 around the circular spreader plate 44 and through the filtration components 30–33, with a discharge of filtered plastic through the outlet passage 26.

During the filter purging operation, this forward flow continues to a substantial degree. However, if the contaminant discharge passage 38 is opened to ambient pressure, it will be appreciated that the pressure differential between the outlet chamber 21 and the discharge passage 38 will create a reverse flow of filtered plastic through breaker plate 33, filter screen 32, breaker plate 30, the triangular pocket 31a with which the collector head 45 is in registration, the triangular inlet 45a, discharge bore 42b and the contaminant discharge passage 38.

In the preferred embodiment, this reverse flow through each of the pockets 31a is for a relatively short period of time (e.g., on the order of two seconds), and the flow is controlled by a valving mechanism in the discharge passage 38 which is described in detail below.

The valving function is coupled with the operation of a mechanism for rotatably indexing the contaminant collector 41 so that the collector head 45 sequentially registers with each of the triangular pockets 31a. After registration, the valving function permits reverse flow for the aforesaid short period of time to release the contaminants captured in the registered pocket 31a. The valve is then closed and the collector head 45 indexed to the next pocket 31a, and the valving cycle repeated. The result is sequential purging of each of the pockets 31a and a stepped, discrete flow of contaminants (in a very small volume of plastic) through the axial bore 42b and contaminant discharge passage 38.

The indexing and valving mechanism is shown in FIGS. 1–5. With initial reference to FIGS. 1 and 4, an annular chamber 52 is defined between the middle block 16 and end block 17 in concentric, surrounding relation to the axial bore 37. Disposed in this annular chamber is an index ring 53 and an annular index wheel 54. Index wheel 54 is disposed within the index ring 53, and both are concentric with the axial bore 37 and axial tube 42 of the contaminant collector 41.

With momentary additional reference to FIG. 10, a keyway 42d is formed in the cylindrical surface of tube 42 at its free end in registration with a notch 54a in the inner surface of index wheel 54, and a key 55 locks the index wheel 54 and tube 42 for rotation together.

As best shown in FIG. 4, a plurality of equiangularly spaced teeth 54b are formed in the outer periphery of index wheel 54. The teeth 54b do not impede rotation of the index wheel 54 relative to the index ring 53.

With continued reference to FIGS. 1 and 4, index ring 53 is formed with a threaded radial projection 53a which extends into an arcuate recess 56 in the bottom of the apparatus 11 between middle block 16 and end block 17. A circular bore 53b extends radially through the entire thickness of the index ring 53 and its radial projection 53a and slidably receives an index pin 57. A threaded cap 58 retains a compression spring 59 so that the pin 57 is normally urged radially inward into engagement with the index wheel 54. The inner end of pin 57 is beveled to abuttably engage the teeth 54b, preventing relative rotation of the index wheel 54 in the clockwise direction as viewed in FIG. 4.

As constructed, the toothed index wheel 54 is caused to move through a full 360° rotation in one direction (clockwise in FIG. 4). The index ring 53 is constrained to reciprocal movement through a relatively small arc, and it is this movement which moves the toothed index wheel 54 in the clockwise direction (as viewed in FIG. 4) one step at a time.

Figure 3:
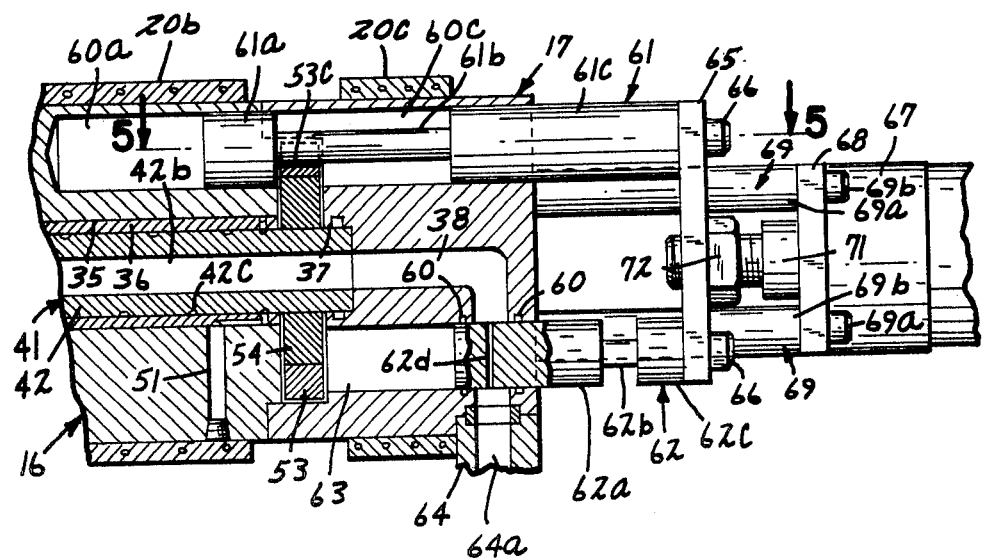
FIG. 3 is a fragmentary sectional view taken along the line 3—3 of FIG. 2, showing in particular the stroking and piston mechanism for effecting the purge cycle on a noninterruptive basis.
Figure 8:
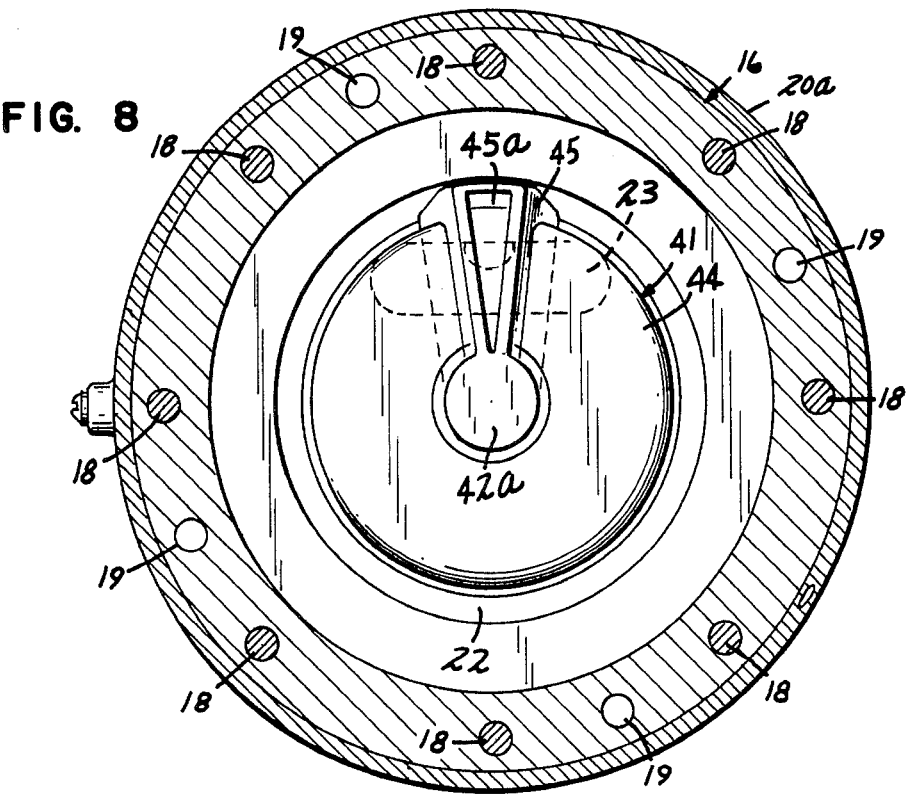
FIG. 8 is an axial sectional view of the inventive filtering apparatus as taken along the line 8—8 of FIG. 1.

This reciprocal arcuate movement of the index ring 53 is caused by a piston 61 and associated actuating mechanism, which is best shown in FIGS. 3–5. With specific reference to FIG. 5, piston 61 comprises solid cylindrical heads 61a, 61c slidably disposed in cylindrical bores 60a, 60c formed in the end block 17, and interconnected by a neck 61b. Heads 61a, 61c are of identical diameter, although head 61c has a considerably greater axial dimension and they are offset slightly to prevent rotation.

The neck 61b is also circular cross section (FIG. 4), but it is considerably smaller in diameter than the heads 61a, 61c and extends angularly from the edge of the head 61a to the opposite edge of the head 61c. In the preferred embodiment, the neck 61b subtends an angle of approximately 15° relative to the longitudinal axes of the heads 61a, 61c.

With continued reference to FIGS. 4 and 5, a notch 53c is formed in the peripheral edge of index ring 53. As shown in FIG. 4, the notch 53c is semicircular as viewed from the end of the ring 53. However, it also subtends an angle of 15° as it traverses from one face of the ring 53 to the other to accommodate the piston neck 61b, as best shown in FIG. 5.

As constructed, it will be appreciated that forward movement of the piston heads 61a, 61c (right to left movement when viewed in FIGS. 3 and 5) will effect limited rotational movement of the index ring 53 for a distance which corresponds generally to the distance between teeth 54b of the index wheel 54. Similarly, rearward movement of the piston 61 effects limited rotational movement of the index ring 53 in the opposite direction, which is counterclockwise as viewed in FIG. 4.

Because the index ring 53 carries the index pin 57 (FIG. 4), it will be seen that the forward thrust of piston 61 causes the index ring 53 to move in a limited manner in the clockwise direction as shown in FIG. 4, carrying the index wheel 54 with it by virtue of the abutting relationship of the pin 57 with the side of the engaged tooth 54b. As the piston 61 is withdrawn, the index ring 53 moves counterclockwise a limited distance, giving rise to an escapement movement of the index pin 57 relative to the adjacent tooth 54b. This is due to the beveled end of the pin 57 and capability of the pin 57 to be moved radially outward against the bias of spring 59. The rotational distance through which the index wheel 54 moves during this cycle corresponds to the rotational distance between the triangular pockets 31a in the collector plate 31. Accordingly, for each stroke of the piston 61, the collector head 45 steps forward to the next triangular pocket 31a.

Valving of the contaminant discharge passage 38 occurs simultaneously through the movement of a second piston 62 that is also slidably disposed in a circular bore 63 formed in the end block 17 and disposed in parallel relation to the bores 60a, 60c. Piston 62 comprises two cylindrical heads 62a, 62c interconnected a neck 62b. Annular seals 60 are disposed for and sealing engagement with the head 62a.

As shown in FIG. 3, the contaminant discharge passage 38 turns 90° and extends radially outward through a small discharge block 64 that is screwed to the end block 17 with screws 75 (FIG. 2). Block 64 has a discharge passage 64a that leads from passage 38 to a contaminant discharge tube 76.

The piston head 62a traverses the radially extending portion of passage 38, and in the "home" or rearward position of pistons 61, 62 shown in FIG. 3, blocks the passage 38. A small bleed hole passes transversely through the head 62a in alignment with the passage 38 and permits a very small continuous flow of plastic with the piston 62 in the "home" position.

The distance between heads 62a and 62c corresponds directly to the transverse dimension of contaminant discharge passage 38, and this gap is disposed so that, with the piston 62 in the forward position, it is in direct registration with the passage 38. This represents the "valve open" position, permitting the contaminant and plastic to flow from the discharge block 64 through tube 76.

It will be appreciated that the respective axial dimensions of the piston heads 61a, 61c, 62a, 62c and necks 61b, 62b determine the "timing" of the apparatus. The pistons 61, 62 move together by reason of their common connection to a rectangular connector plate 65 with screws 66. As the pistons 61, 62 move forward, pin 57 causes the index wheel 54 to step forward in the clockwise direction as described above. By virtue of its connection to the discharge tube 42 (by the key 55), a commensurate sequential stepping of the collector head 45 to the next triangular pocket 31a is the result.

At the same time, piston head 62a continues to block discharge passage 38 until the end of the stroke, at which time the space between heads 62a, 62c registers with the passage 38. As mentioned above, this registration or "valve open" position has a duration of approximately two seconds in the preferred embodiment.

As the piston 62 is withdrawn, discharge passage 38 is immediately blocked by the head 62a, and, at the same time, the piston 61 causes movement of the index ring 53 to index pin 57 relative to the next tooth 54b.

The reverse flow of a plastic-contaminant mix in discharge passage 38 occurs only when the piston 62 is in the "valve open" position, and the result is a stepped flow within the passage 38 in small, discrete quantities. There is only one limited period of contaminant flow for each of the pockets 31a, thus avoiding an unnecessary waste of plastic during the purging operation.

With reference to FIGS. 1–3, a fluid cylinder 67 (either pneumatic or hydraulic) causes the pistons 61, 62 to reciprocate. Cylinder 67 has a mounting flange 68 that is secured directly to the end block 17 by four cylinder posts 69. Each of the posts 69 comprises a tubular sleeve 69a that acts as a spacer between the mounting flange 68 and end block 17, and a bolt 69b that screws directly into the end block 17.

The extensible rod of cylinder 67 bears the reference numeral 71, and it is threaded into a threaded opening in the connector plate 65. A nut 72 on the rod 71 locks these components into place.

An alternative embodiment of the valving mechanism is shown in FIGS. 12–16, in which components identical to those of FIGS. 1–11 are provided with like numerals.

With reference to FIGS. 12 and 13, an L-shaped discharge block 80 interlockably fits into a rectangular recess formed in the bottom of end block 17. The end block 17 and discharge block 80 are secured together by two bolts 83.

The contaminant discharge passage 38 within end block 17 is enlarged at its juncture with discharge block 80 to define an annular chamber in which a circular washer seal 82 is disposed. A similar chamber is formed in the discharge block 80 to receive an identical circular seal 82 in spaced relation to the first.

A rectangular passageway 84 is machined in the interior face of end block 17 at its juncture with discharge block 80 to slidably receive a rectangular valve bar 85. Valve bar 85 has a generally circular transverse bore 85a corresponding in size to the contaminant discharge passage 38 and disposed so that it registers with the passage 38 when the valve bar 85 is at its forwardmost stroke. Such movement opens the passage 38 for the aforementioned period of short duration to permit stepped outward flow of contaminants in the same manner as with piston 62. The leading edge of the bore 85a is tapered slightly (FIG. 12) to provide a more effective seal-off as the valve bar 85 is withdrawn.

With reference to FIGS. 12 and 13, an elongated pin 86 having an enlarged head 86a is screwed into the end of bar valve 85. Pin 86 has a smooth cylindrical outer surface, and the rectangular connector plate 65 has a transverse bore sized to permit it to slide relatively to the pin 86. A spring is disposed in compression between the enlarged head 86a and the connector plate 65.

On the foreward stroke of the cylinder 67, the connector plate 65 abuts the end of bar valve 85 to stroke it forward simultaneous with the piston 61. However, as the cylinder 67 is retracted, the connector plate 65 withdraws the bar valve 85 through the intervening resiliency of the spring 87. Under normal conditions, the bar valve 85 is stroked rearwardly with the piston 61. However, in the event that a larger contaminant becomes lodged between the discharge passage 38 and bore 85a, the bar valve 85 will remain in place while the cylinder 67 withdraws the connector plate 65 against the spring 87 in an over-riding manner. If the bar valve 85 remains in this jammed position for any period of time, it will be readily detected by the substantially continuous flow of plastic from the discharge tube 76. It is also possible that the substantially continuous flow of plastic and contaminants through the discharge passage 38 will clear the bore 85a, permitting the bar valve 85 to resume normal operation.

When the bar valve 85 is in its normal closed position, a small amount of melted plastic is caused to continuously bleed through the closed valve to reduce the likelihood of plastic degradation resulting from static flow. The structure for accomplishing this bleed is shown in FIGS. 12 and 14–16.

A small transverse bore 88 is formed through the bar valve 85 from its top face to its bottom face, and extending at an angle relative to a line which is normal to these surfaces. The angularity of the bore 88 is such that, with the bar valve 85 in the "at home" position, its lower opening 88a is in communication with the contaminant discharge passage, whereas its upper opening 88b directly underlies the circular seal 82 and is not in communication with the contaminant discharge passage.

Figure 15:
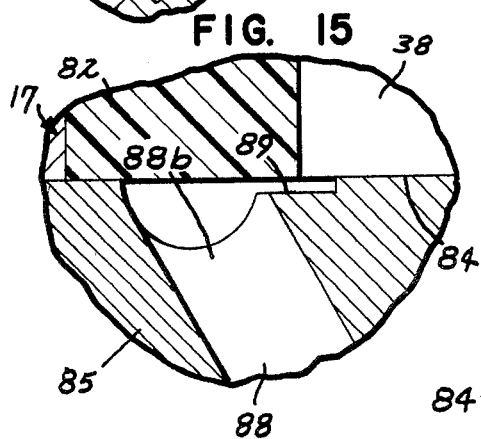
FIG. 15 is an enlarged fragmentary sectional view of the alternative valving arrangement taken along the line 15—15 of FIG. 14.
Figure 16:
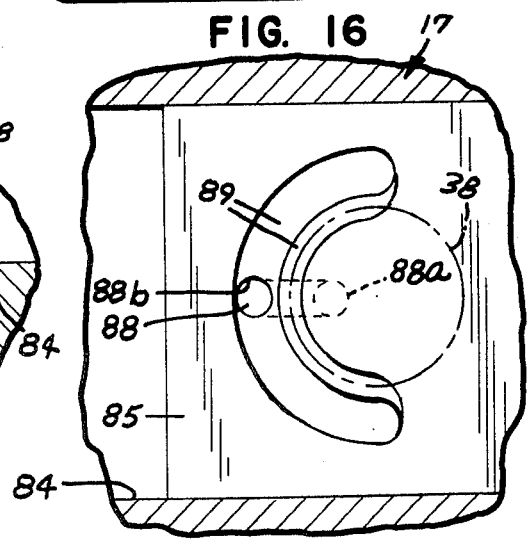
FIG. 16 is an enlarged fragmentary sectional view of the alternative valving arrangement taken along the line 16—16 of FIG. 12.

With specific reference to FIGS. 15 and 16, a shallow semicircular groove 89 is cut into the top surface of bar valve 85, the middle or center of which communicates directly with the upper opening 88b. The opposite ends of the groove 89 communicate directly with the contaminant discharge passage 38. As particularly shown in FIG. 15, it is the short extension of the ends of groove 89 beyond the side wall of discharge block 80 that establish communication with the contaminant discharge passage 38.

The shallow dimension of the groove 89 coupled with the short extension of the groove ends into the discharge passage 38 presents a small flow passage, and only a small amount of plastic enters the groove 89 with the bar valve 85 in the "home" position. Because the groove 89 is small in comparison to the angular bore 88, there is assurance that all plastic which enters the groove 89 will continue its flow through the bore 88.

During normal filter operation of the apparatus 11, the unfiltered plastic enters from inlet pipe 12 through the flared inlet passage 23, around the circular spreader plate 44, through all but one of the triangular pockets 31a, the filter screen 32, breaker plate 33 and out the outlet pipe 13 to the extruder die 14. During such normal filter operation, the cylinder 67 is in the withdrawn or "home" position and contaminant discharge passage 38 is blocked but for the bleed flow through bleed hole 62d or bleed passages 88, 89 as discussed above. This creates a static pressure in the passages 38, 42b, and there is no reverse flow through the collector head 45.

Purging of the filter screen 32 is on a periodic basis, and it may be accomplished by manual operation, or with the use of a control circuit which causes semiautomatic or fully automatic operation.

With the collector head 45 in a given position overlying one of the triangular collector pockets 31a, cylinder 67 is stroked forward from its "home" position, which simultaneously causes pin 57 to advance the index wheel 54 and head 45, and at the end of the stroke to open the contaminant discharge passage 38 for a period of brief duration, preferably on the order of two seconds. This function is the same for each of the valve embodiments described hereinabove.

When the cylinder 67 is retracted, the passage 38 is closed early in this rearward stroke, and at the same time index ring 53 moves the pin 57 over the beveled face of the adjacent gear tooth 54b to index the mechanism for the next stroke.

The operation continues with the next forward stroke of cylinder 67, with opening of the discharge passage 38 to permit reverse flow through the registered pocket 31a, collector head 45, bore 42b and discharge passage 38. As described above, this flow occurs only so long as the discharge passage 38 is open, resulting in a stepped, discrete flow through each pocket 31a. While this flow is short in duration, it is sufficient to purge those contaminants in the filter screen with which the collector head 45 is in registration. The stepped reverse flow utilizes very little of the filtered plastic as a carrier for the contaminants and thus avoids unnecessary waste caused by purging for extended periods of time.

Accordingly, the inventive apparatus 11 permits continuous efficient filtration of an incoming flow of melted plastic and intermittent, efficient purging of the filter screen without interrupting the filter operation. Purging is accomplished without any possibility of introducing air into the system and avoids the unnecessary waste of filtered plastic acting as a carrier for the contaminants.

What is claimed is:

1. Apparatus for continuously filtering a flow of material, comprising:
    housing means defining an inlet for the unfiltered material and an outlet for filtered material;
    filter means disposed in the housing between the inlet and outlet;
    collector means disposed adjacent the filter means on its upstream side, the collector means having a plurality of separate passages defining collector pockets for contaiminants filtered by the filter means, the collector means being otherwise imperforate;
    collector head means disposed in the housing means for movement relative to the collector means, the collector head means being configured for discrete communication with each of said collector pockets;
    first drive means for moving the collector head means through a series of stationary positions in stepped sequence, each stationary position corresponding to a collector pocket with which the collector head means is in registration;
    a contaminant dischage passage disposed in the housing means in communication with the collector head means, the discharge passage including a discharge outlet for contaminants;
    valve means for blocking the discharge passage between the collector head means and discharge outlet in a first position, and for opening the discharge passage in a second position;
    second drive means for moving the valve means between said first and second positions;
    and actuator means commonly connected to the first and second drive means for simultaneous operation thereof in timed relation, the actuator means and first and second drive means being contructed and arranged to open the discharge passage when the collector head means is in stationary registration with a selected collector pocket, and to close the discharge passage when the collector head means is moved between collector pocket registration positions.

2. The apparatus defined by claim 1, wherein the actuator means comprises a fluid actuator movable between extended and retracted positions to simultaneous operate the first and second drive means.

3. Apparatus for continuously filtering a flow of material, comprising:
    housing means defining an inlet for the unfiltered material and an outlet for filtered material;
    filter means disposed in the housing between the inlet and outlet;
    collector means disposed adjacent the filter means on its upstream side, the collector means having a plurality of separate passages defining collector pockets for contaminants filtered by the filter means, the collector means being otherwise imperforate;
    collector head means disposed in the housing means for movement relative to the collector means, the collector head means being configured for discrete communication with each of said collector pockets;
    first drive means for moving the collector head means through a series of stationary positions in stepped sequence, each stationary position corresponding to a collector pocket with which the collector head means is in registration;

a contaminant discharge passage disposed in the housing means in communication with the collector head means, the discharge passage including a discharge outlet for contaminants;

valve means for blocking the discharge passage between the collector head means and discharge outlet in a first position, and for opening the discharge passage in a second position;

second drive means for moving the valve means between said first and second positions;

and actuator means commonly connected to the first and second drive means for simultaneous operation thereof in timed relation, the actuator means being constructed and arranged to open the discharge passage for a period of time which is less than the period of time in which the collector head means is in stationary registration with each collector pocket.

4. The apparatus defined by any one of claims 1 or 3, wherein:

the collector means comprises a plate with the collector pockets disposed in a circular configuration around a predetermined center axis;

and the collector head means is rotatably movable about said center axis.

5. The apparatus defined by claim 4, wherein:

the collector pockets of the collector plate are identical in size and extend radially outward from said center axis;

and the collector head means defines an inlet opening that conforms in size and shape to the collector pockets.

6. The apparatus defined by claim 5, wherein the collector pockets are of triangular configuration and equiangularly spaced about said center axis.

7. The apparatus defined by claim 5, wherein the collector head means comprises:

a tubular member carried by the housing means for rotation about said center axis, the tubular member defining an axially extending passageway for contaminants which is disposed in communication with said contaminant discharge passage;

and a collector head extending radially outward from said tubular member and rotatable therewith, the collector head being disposed for selective registration with the respective collector pockets.

8. The apparatus defined by claim 4, wherein the first drive means is constructed and arranged to rotatably step the collector head means for individual registration thereof with the collector pockets in sequence.

9. The apparatus defined by claim 8, wherein the first drive means comprises:

an index ring disposed for reciprocating rotational movement within the housing means;

index pin means carried by the index ring and projecting therefrom;

an index wheel mounted in the housing means for rotation relative to the index ring and secured to the collector head means for rotation therewith;

the index wheel having a plurality of teeth disposed for engagement by the index pin means, the teeth corresponding in number and angular position to the collector pockets;

the index pin means being constructed and arranged to sequentially engage the teeth in escapement fashion as the index ring is reciprocally rotated;

and reciprocating means for reciprocally rotating the index ring.

10. The apparatus defined by claim 9, wherein the collector head means comprises:

a tubular member carried by the housing for rotation about said center axis, the tubular member defining an axially extending passageway for contaminants which is disposed in communication with said contaminant discharge passage;

and a collector head extending radially outward from said tubular member and rotatable therewith, the collector head being disposed for selective registration with the respective collector pockets;

the tubular member being connected to the index wheel for rotation therewith.

11. The apparatus defined by claim 9, wherein the index ring and index wheel are concentrically disposed relative to said center axis.

12. The apparatus defined by claim 11, wherein the index wheel is disposed within the index ring, said teeth projecting radially outward from the outer periphery of the index wheel, and the index pin means projecting radially inward from the inner periphery of the index ring.

13. The apparatus defined by claim 12, wherein the index pin means comprises:

an index pin slidably disposed within the index ring between an extended position in which it engages one of said teeth, and a retracted nonengaging position;

and biasing means carried by the index wheel for normally urging the index pin into said extended position.

14. The apparatus defined by claim 11, wherein the reciprocating means comprises:

piston means slidably disposed in the housing for reciprocal movement in a direction transverse to the index ring, the piston means including a drive member that is angularly disposed relative to said center axis;

the index ring having a slot extending transversely therethrough and disposed to slidably receive the drive member;

and actuator means for linearly reciprocating the piston means.

15. The apparatus defined by claim 14, wherein the piston means is reciprocally movable in a direction substantially parallel with said center axis, and said actuator means comprises a fluid actuator.

16. The apparatus defined by any one of claims 1 or 3, wherein the valve means comprises a valve member slidably disposed in the housing means transversely to the contaminant discharge passage and in communication therewith, the valve member defining passage means disposed for registration with the discharge passage in said second position.

17. The apparatus defined by claim 16, wherein the passage means corresponds in size to said contaminant discharge passage.

18. The apparatus defined by claim 16, wherein the valve member comprises first and second cylindrical piston heads of substantially the same size spaced apart by a neck member of lesser transverse dimension, the space between said piston heads defining said passage means.

19. The apparatus defined by claim 18, wherein the valve means comprises a rectangular bar having a transverse bore formed therethrough to define said passage means.

* * * * *

UNITED STATES PATENT AND TRADEMARK OFFICE
CERTIFICATE OF CORRECTION

PATENT NO. : 4,486,304

DATED : December 4, 1984

INVENTOR(S) : Clayton L. Neuman et al

It is certified that error appears in the above-identified patent and that said Letters Patent is hereby corrected as shown below:

Column 12, line 10, "contaiminants" should be --contaminants--.

Column 12, line 23, "dischage" should be --discharge--.

Signed and Sealed this

Third Day of September 1985

[SEAL]

Attest:

DONALD J. QUIGG

*Attesting Officer*     *Acting Commissioner of Patents and Trademarks - Designate*